US008329336B2

(12) United States Patent
Soloveichik et al.

(10) Patent No.: US 8,329,336 B2
(45) Date of Patent: Dec. 11, 2012

(54) COMPOSITION AND ENERGY STORAGE DEVICE (75) Inventors: Grigorii Lev Soloveichik, Latham, NY (US); Richard Louis Hart, Broadalbin, NY (US); John Patrick Lemmon, Kennewick, WA (US)

(73) Assignee: General Electric Company, Niskayuna, NY (US)

( * ) Notice: Subject to any disclaimer, the term of this patent is extended or adjusted under 35 U.S.C. 154(b) by 253 days.

(21) Appl. No.: 12/893,661

(22) Filed: Sep. 29, 2010

(65) Prior Publication Data

US 2012/0077070 A1  Mar. 29, 2012

(51) Int. Cl.
*H01M 4/58* (2010.01)
*H01M 10/36* (2010.01)
*H01M 10/38* (2006.01)

(52) U.S. Cl. ..... 429/199; 429/209; 29/623.5; 252/182.1
(58) Field of Classification Search ................... 429/199
See application file for complete search history.

(56) References Cited

U.S. PATENT DOCUMENTS

| | | |
|---|---|---|
| 3,437,571 A | 4/1969 | Renzoni et al. |
| 4,288,506 A | 9/1981 | Coetzer et al. |
| 4,357,399 A | 11/1982 | Auborn et al. |
| 4,529,676 A | 7/1985 | Galloway et al. |
| 4,592,969 A | 6/1986 | Coetzer et al. |
| 4,797,333 A | 1/1989 | Coetzer et al. |
| 4,975,343 A | 12/1990 | Coetzer |
| 5,283,135 A | 2/1994 | Redey et al. |
| 5,340,668 A | 8/1994 | Redey et al. |
| 5,403,676 A | 4/1995 | Coetzer et al. |
| 5,476,733 A | 12/1995 | Coetzer et al. |
| 5,536,593 A | 7/1996 | Redey et al. |
| 5,573,873 A | 11/1996 | Bugga et al. |
| 5,604,053 A | 2/1997 | Coetzer et al. |
| 5,962,171 A | 10/1999 | Boguslavsky et al. |
| 5,972,533 A | 10/1999 | Coetzer et al. |
| 7,241,535 B2 * | 7/2007 | Kim et al. ..................... 429/324 |
| 7,632,604 B2 | 12/2009 | Iacovangelo et al. |
| 8,026,000 B2 * | 9/2011 | Iwanaga et al. ............... 429/199 |
| 8,062,788 B2 * | 11/2011 | Issaev et al. .................. 429/199 |
| 2012/0040230 A1 * | 2/2012 | Sudworth ..................... 429/131 |

OTHER PUBLICATIONS

Bones, R. J.; Teagle, D. A.; Brooker, S. D.; Cullen, F. L., Development of a nickel/nickel dichloride positive electrode for a liquid sodium (ZEBRA) battery cell. Journal of the Electrochemical Society 1989, 136, (5), 1274-7.
J.L. Sudworth; The Sodium/Nickel chloride (ZEBRA) battery; Journal of Power Sources 100 (2001),149-163.

* cited by examiner

*Primary Examiner* — John S Maples
(74) *Attorney, Agent, or Firm* — Andrew J. Caruso (57) ABSTRACT

A cathode composition is provided. The cathode composition includes at least one electroactive metal, wherein the electroactive metal is at least one selected from the group consisting of titanium, vanadium, niobium, molybdenum, nickel, iron, cobalt, chromium, manganese, silver, antimony, cadmium, tin, lead and zinc; a first alkali metal halide; an electrolyte salt comprising a reaction product of a second alkali metal halide and a metal halide, wherein the electrolyte salt has a melting point of less than about 300 degrees Centigrade; and a metal chlorosulfide compound having a formula (I) $M^1 M^2_{p+1} S_n Cl_{4+3p-2n}$ wherein "$M^1$" is a metal selected from group IA of the periodic table, "$M^2$" is a metal selected from group IIIA of the periodic table, "p" is 0 or 1, and "n" is equal to or greater than 0.5. An article and an energy storage device comprising the cathode composition is provided. A method of forming the energy storage device is provided.

20 Claims, 2 Drawing Sheets

FIG. 1

FIG. 2

COMPOSITION AND ENERGY STORAGE DEVICE

BACKGROUND

The invention includes embodiments that relate to an electrode composition and method of its making. The invention includes embodiments that relate to an electrode for an energy storage device.

Metal chloride batteries especially sodium-nickel chloride batteries with a molten sodium anode and a beta-alumina solid electrolyte are widely employed for energy storage applications. When the metal chloride batteries are employed in mobile applications like hybrid locomotives or plug-in electric vehicles (PHEV), the sodium nickel chloride battery should tolerate power surges (high currents) both during charging and discharging of the battery without loss in the working capacity and the cycle life of the battery. To provide better fuel economy via regenerative braking, i.e., the ratio of discharged to charged energy that decreases with the current increase, better electric efficiency is desirable.

One way of improving the performance of a battery is by the addition of small amounts of additives to the cathode compositions. Additives employed in the art include sodium salt of halogen other than chloride (sodium iodide, sodium fluoride, and sodium bromide), elemental sulfur, sodium sulfide ($Na_2S$), iron sulfide (FeS), and combinations of the foregoing additives. However, use of these additives neither substantially help in increasing the low working capacity of the battery nor helped in minimizing cell capacity degradation, particularly for batteries employed in high current applications.

Therefore, there exists a need for an improved solution to the long-standing problem of high current cell performance by addition of additives for the electrode that significantly improve the cell working capacity and decreases the capacity degradation rate.

BRIEF DESCRIPTION

In accordance with one aspect of the present invention, a cathode composition is provided that includes at least one electroactive metal, wherein the electroactive metal is at least one selected from the group consisting of titanium, vanadium, niobium, molybdenum, nickel, iron, cobalt, chromium, manganese, silver, antimony, cadmium, tin, lead and zinc; a first alkali metal halide; an electrolyte salt comprising a reaction product of a second alkali metal halide and a metal halide, wherein the electrolyte salt has a melting point of less than about 300 degrees Centigrade; and a metal chloro sulfide compound having a formula (I) $M^1M^2_{p+1}S_nCl_{4+3p-2n}$ wherein "$M^1$" is a metal selected from group IA of the periodic table, "$M^2$" is a metal selected from group IIIA of the periodic table, "p" is 0 or 1, and "n" is equal to or greater than 0.5.

In accordance with one aspect of the present invention, an article is provided that includes a cathode composition. The cathode composition comprises at least one electroactive metal, wherein the electroactive metal is at least one selected from the group consisting of titanium, vanadium, niobium, molybdenum, nickel, iron, cobalt, chromium, manganese, silver, antimony, cadmium, tin, lead and zinc; a first alkali metal halide; an electrolyte salt comprising a reaction product of a second alkali metal halide and a metal halide, wherein the electrolyte salt has a melting point of less than about 300 degrees Centigrade; and a metal chlorosulfide compound having a formula (I) $M^1M^2_{p+1}S_nCl_{4+3p-2n}$ wherein "$M^1$" is a metal selected from group IA of the periodic table, "$M^2$" is a metal selected from group IIIA of the periodic table, "p" is 0 or 1, and "n" is equal to or greater than 0.5.

In accordance with one aspect of the present invention, an energy storage device is provided. The device includes (a) a first compartment comprising an alkali metal; (b) a second compartment comprising a cathode composition, the cathode composition comprising: at least one electroactive metal, wherein the electroactive metal is at least one selected from the group consisting of titanium, vanadium, niobium, molybdenum, nickel, iron, cobalt, chromium, manganese, silver, antimony, cadmium, tin, lead and zinc; a first alkali metal halide; an electrolyte salt comprising a reaction product of a second alkali metal halide and a metal halide, wherein the electrolyte salt has a melting point of less than about 300 degrees Centigrade; and a metal chlorosulfide compound having a formula (I) $M^1M^2_{p+1}S_nCl_{4+3p-2n}$ wherein "$M^1$" is a metal selected from group IA of the periodic table, "$M^2$" is a metal selected from group IIIA of the periodic table, "p" is 0 or 1, and "n" is equal to or greater than 0.5; and (c) a solid separator capable of transporting alkali metal ions between the first and the second compartments.

In accordance with one aspect of the present invention, a method for preparation of the energy storage device is provided. The method comprises providing a housing having an interior surface defining a volume; disposing a separator inside the housing, wherein the separator has a first surface that defines at least a portion of a first compartment, and a second surface that defines a second compartment; wherein the first compartment is in ionic communication with the second compartment through the separator; disposing a cathode composition in the second compartment, wherein the cathode composition comprises: at least one electroactive metal, wherein the electroactive metal is at least one selected from the group consisting of titanium, vanadium, niobium, molybdenum, nickel, iron, cobalt, chromium, manganese, silver, antimony, cadmium, tin, lead and zinc; a first alkali metal halide; an electrolyte salt comprising a reaction product of a second alkali metal halide and a metal halide, wherein the electrolyte salt has a melting point of less than about 300 degrees Celsius; and a metal chlorosulfide compound having a formula (I) $M^1M^2_{p+1}S_nCl_{4+3p-2n}$ wherein "$M^1$" is a metal selected from group IA of the periodic table, "$M^2$" is a metal selected from group IIIA of the periodic table, "p" is 0 or 1, and "n" is equal to or greater than 0.5; wherein a molten solution of the metal chlorosulfide compound in the electrolyte salt is impregnated in a mixture comprising the at least one electroactive metal and the alkali metal halide.

BRIEF DESCRIPTION OF THE FIGURES

These and other features, aspects, and advantages of the present invention will become better understood when the following detailed description is read with reference to the accompanying drawings in which like characters represent like parts throughout the drawings, wherein.

DETAILED DESCRIPTION

The invention relates generally to a cathode composition. More particularly the invention relates to a cathode composition for an energy storage device. The invention includes embodiments that relate to a method of making the energy storage device.

Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Similarly, "free" may be used in combination with a term, and may include an insubstantial number, or trace amounts, while still being considered free of the modified term.

As used herein, the terms "may" and "may be" indicate a possibility of an occurrence within a set of circumstances; a possession of a specified property, characteristic or function. These terms may also qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances, an event or capacity can be expected, while in other circumstances the event or capacity cannot occur—this distinction is captured by the terms "may" and "may be".

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

"Optional" or "optionally" means that the subsequently described event or circumstance may or may not occur, and that the description includes instances where the event occurs and instances where it does not.

Furthermore, whenever a particular feature of the invention is said to comprise or consist of at least one of a number of elements of a group and combinations thereof, it is understood that the feature may comprise or consist of any of the elements of the group, either individually or in combination with any of the other elements of that group.

When introducing elements of various embodiments of the present invention, the articles "a," "an," "the," and "said" are intended to mean that there are one or more of the elements. The terms "comprising," "including," and "having" are intended to be inclusive, and mean that there may be additional elements other than the listed elements. Furthermore, the terms "first," "second," and the like, herein do not denote any order, quantity, or importance, but rather are used to distinguish one element from another.

Embodiments of the invention described herein address the noted shortcomings of the state of the art. These embodiments advantageously provide an improved cathode composition for use in a metal-metal chloride battery, for example a sodium-nickel chloride battery. The cathode composition comprises at least one electroactive metal, a first alkali metal halide, an electrolyte salt comprising a reaction product of a second alkali metal halide and a metal halide, wherein the electrolyte salt has a melting point of less than about 300 degrees Centigrade; and a metal chlorosulfide compound having a formula (I), $M^1M^2_{p+1}S_nCl_{4+3p-2n}$ wherein "$M^1$" is a metal selected from group IA of the periodic table, "$M^2$" is a metal selected from group IIIA of the periodic table, "p" is 0 or 1, and "n" is equal to or greater than 0.5. The cathode composition may also include products of the chemical or electrochemical interaction of the various elements listed herein. Advantageously, the invention solves the problem of high current cell performance through the addition of the metal chlorosulfide compound having a formula (I), at times referred to as a sulfur source, for the cathode. The sulfur source may significantly improve the working capacity of the cell and decrease the degradation rate of the cell capacity. The sulfur source as a solution in molten $NaAlCl_4$ may be added under relatively dry conditions (under dry inert gas or in vacuum) used for handling of the sodium aluminum tetrachloride electrolyte as compared to the currently available sulfur sources. The dry conditions are advantageous, as the presence of moisture may result in accelerating deterioration of cell performance and also in evolution of hazardous hydrogen sulfide gas. Embodiments of the invention also provide an article and an energy storage device comprising the cathode composition comprising the metal chlorosulfide compound having the formula (I). Embodiments of the invention also provide a method of forming the energy storage device.

As used herein, cathodic material is a material that supplies electrons during the charging process of a battery and is present as part of a redox reaction. Anodic material accepts electrons during the charging process of a battery and is present as part of the redox reaction. The cathode includes cathodic materials having differing functions: an electrode material, a support structure, and a current collector. The electrode materials are present in the cathode as participating electrochemical reactants both in their oxidized or reduced state, or at some state between full oxidation or reduction. The electroactive metal is a metal that oxidizes in molten sodium tetrachloroaluminate to the metal salt above the oxidation potential of aluminum (about 1.58 V vs. Na) and below the oxidation potential of chloride (about 4.15 V vs. Na). The support structure does not undergo much change during any chemical reaction during the charge/discharge, but does provide electron transport and supports the electrode material as the electrode material undergoes chemical reaction and allows for a surface upon which solids may precipitate as needed. An electrolyte is a medium that provides an ion transport mechanism between the positive and negative electrodes of a cell, and may act as a solvent for the oxidized form of the electrode material. Additives that facilitate the ion transport mechanism, but do not themselves provide the mechanism, are distinguished from the electrolyte itself.

As noted, in one aspect of the present invention, a cathode composition is provided that includes at least one electroactive metal; a first alkali metal halide; an electrolyte salt comprising a reaction product of a second alkali metal halide and a metal halide; and a metal chloro sulfide compound having a formula (I).

In one embodiment, the electroactive metal may be at least one transition metal selected from the group consisting of titanium, vanadium, niobium, molybdenum, nickel, iron, cobalt, chromium, manganese, molybdenum, and silver. In one embodiment, the electroactive metal may be at least one metal selected from antimony, cadmium, tin, lead, and zinc. In one embodiment, the electroactive metal may be nickel. In another embodiment, the electroactive metal may be iron. In yet another embodiment, the electroactive metal may be antimony. In one embodiment, the electroactive metal may optionally include a salt of the electroactive metal. In one embodiment, the electroactive metal salt may include nitrate, sulfide, or halide of the electroactive metal. In one embodiment, the electroactive metal salt may include halide of the electroactive metal.

The cathode composition includes a first alkali metal halide. In one embodiment, the first alkali metal halide is at least one alkali metal halide selected from sodium chloride, sodium iodide, sodium bromide, sodium fluoride, potassium chloride, potassium iodide, potassium bromide, potassium fluoride, lithium chloride, lithium iodide, lithium bromide, lithium fluoride, and cesium chloride. In one embodiment, the cathode composition may further include aluminum.

The cathode composition includes an electrolyte salt comprising a reaction product of a second alkali metal halide and a metal halide other than the second alkali metal halide. In one embodiment, the second alkali metal halide may be at least one selected from sodium halide, lithium halide, potassium halide, cesium halide, and rubidium halide. In one embodiment, the second alkali metal halide includes sodium halide, potassium halide, lithium halide, or combinations thereof. In another embodiment, the first alkali metal halide may be sodium halide. The halide includes at least one halogen selected from chlorine, bromine, and fluorine. In one embodiment, the halogen may be chlorine.

In one embodiment, the metal halide other than the second alkali metal halide comprises at least one metal halide selected from an aluminum halide, a gallium halide, and an indium halide. Suitable aluminum halides include at least one aluminum halide selected from aluminum chloride, aluminum bromide, and aluminum fluoride. In one embodiment, the metal halide is an aluminum halide, for example aluminum chloride.

The electrolyte salt comprising the reaction product of a second alkali metal halide and a metal halide has a melting point of less than about 300 degrees Centigrade. In one embodiment, the electrolyte salt comprising the second alkali metal halide and a metal halide has a melting point in a range from about 300 degrees to about 250 degrees Centigrade, from about 250 degrees Centigrade to about 200 degrees Centigrade, or from about 200 degrees Centigrade to about 150 degrees Centigrade.

In one embodiment, the amount of electrolyte salt employed is in a range of about 22 weight percent to about 35 weight percent based on the total amount of the cathode composition. In another embodiment, the amount of electrolyte salt employed is in a range of about 25 weight percent to about 32 weight percent based on the total amount of the cathode composition. In yet another embodiment, the amount of electrolyte salt employed is in a range of about 28 weight percent to about 30 weight percent based on the total amount of the cathode composition.

In one embodiment, the second alkali metal halide and the metal halide of the electrolyte salt, are present in a molar ratio in a range from about 1:1 to about 1:2 in the reaction product. In another embodiment, the second alkali metal halide and the metal halide are present in a molar ratio in a range from about 0.53:0.48 to about 0.45:0.55 in the reaction product. In one embodiment, the electrolyte salt is sodium tetrachloroaluminate, which is a reaction product of sodium chloride and aluminum chloride.

In one embodiment, the amount of electroactive metal employed is in a range of about 20 weight percent to about 60 weight percent based on the total amount of the cathode composition. In another embodiment, the amount of electroactive metal employed is in a range of about 25 weight percent to about 50 weight percent based on the total amount of the cathode composition. In yet another embodiment, the amount of electroactive metal employed is in a range of about 30 weight percent to about 45 weight percent based on the total amount of the cathode composition.

In one embodiment, the amount of first alkali metal halide employed is in a range of about 10 weight percent to about 40 weight percent based on the total amount of the cathode composition. In another embodiment, the amount of first alkali metal halide employed is in a range of about 15 weight percent to about 30 weight percent based on the total amount of the cathode composition. In yet another embodiment, the amount of first alkali metal halide employed is in a range of about 20 weight percent to about 25 weight percent based on the total amount of the cathode composition.

As noted, the cathode composition includes a metal chlorosulfide compound. The metal chlorosulfide compound has the formula (I) $M^1M^2_{p+1}S_nCl_{4+3p-2n}$ wherein "$M^1$" is a metal selected from group IA of the periodic table, "$M^2$" is a metal selected from group IIIA of the periodic table, "p" is 0 or 1, and "n" is equal to or greater than 0.5. One skilled in the art will appreciate that $M^1M^2_{p+1}S_nCl_{4+3p-2n}$ represents "an idealized formula" which represents the reaction product of an alkali metal sulfide (for example lithium sulfide $Li_2S$, sodium sulfide $Na_2S$, or potassium sulfide $K_2S$) with a sodium metal tetrachloride $NaMCl_4$, for example, sodium aluminum tetrachloride, $NaAlCl_4$, or a metal trichloride $MCl_3$ where M is Al or Ga. In one embodiment, the metal chlorosulfide compound having the formula (I) comprises sodium aluminum chlorosulfide, lithium aluminum chlorosulfide, or sodium gallium chlorosulfide. In one embodiment, the metal chlorosulfide compound having the formula (I) comprises sodium aluminum chloro sulfide.

In one embodiment, the metal chlorosulfide compound having the formula (I) is present in an amount in a range from about 0.3 weight percent to about 10 weight percent, based on the total weight of the cathode composition. In another embodiment, the metal chlorosulfide compound is present in an amount in a range from about 0.5 weight percent to about 9 weight percent, based on the total weight of the cathode composition. In yet another embodiment, the metal chlorosulfide compound is present in an amount in a range from about 4 weight percent to about 7 weight percent, based on the total weight of the cathode composition.

In one embodiment, the cathode composition may include other additives that may affect the performance of an energy storage device. Such performance additives may increase ionic conductivity, increase or decrease solubility of the charged cathodic species, improve wetting of a solid electrolyte i.e., the separator, by a molten electrolyte, or prevent ripening of the cathode microdomains, to name several utilities. In one embodiment, the performance additive may be present in an amount that is less than about 5 mole percent compared to the total combined moles of the first alkali metal halide, the electrolyte salt, and the electroactive metal present in the cathode composition. In one embodiment, the performance additive may be alkali metal halide salt. In one embodiment, the performance additive may comprise a bromide salt, a fluoride salt, or an iodide salt of an alkali metal halide. Suitable examples of performance additives include, sodium iodide, sodium fluoride, and sodium iodide.

In another embodiment of the present invention, an article is provided that includes a cathode. The cathode comprises at least one electroactive metal, wherein the electroactive metal is at least one selected from the group consisting of titanium, vanadium, niobium, molybdenum, nickel, iron, cobalt, chromium, manganese, silver, antimony, cadmium, tin, lead and zinc; a first alkali metal halide; an electrolyte salt comprising a reaction product of a second alkali metal halide and a metal halide, wherein the electrolyte salt has a melting point of less than about 300 degrees Centigrade; and a metal chloro sulfide compound having a formula (I) $M^1M^2_{p+1}S_nCl_{4+3p-2n}$ wherein "$M^1$" is a metal selected from group IA of the periodic table, "$M^2$" is a metal selected from group IIIA of the periodic table, "p" is 0 or 1, and "n" is equal to or greater than 0.5.

In accordance with one aspect of the present invention, an energy storage device is provided. The device includes (a) a first compartment comprising an alkali metal; (b) a second compartment comprising a cathode composition, the cathode composition comprising: at least one electroactive metal, wherein the electroactive metal is at least one selected from the group consisting of titanium, vanadium, niobium, molybdenum, nickel, iron, cobalt, chromium, manganese, silver, antimony, cadmium, tin, lead and zinc; a first alkali metal halide; an electrolyte salt comprising a reaction product of a second alkali metal halide and a metal halide, wherein the electrolyte salt has a melting point of less than about 300 degrees Centigrade; and a metal chloro sulfide compound having a formula (I) $M^1M^2_{p+1}S_nCl_{4+3p-2n}$ wherein "$M^1$" is a metal selected from group IA of the periodic table, "$M^2$" is a metal selected from group IIIA of the periodic table, "p" is 0 or 1, and "n" is equal to or greater than 0.5; and (c) a solid separator capable of transporting alkali metal ions between the first and the second compartments.

The device includes a housing having an interior surface defining a volume. A separator is disposed in the volume. The separator has a first surface that defines at least a portion of a first compartment, and a second surface that defines a second compartment. The first compartment is in ionic communication with the second compartment through the separator. As used herein the phrase "ionic communication" refers to the traversal of ions between the first compartment and the second compartment through the separator.

Figure 1:
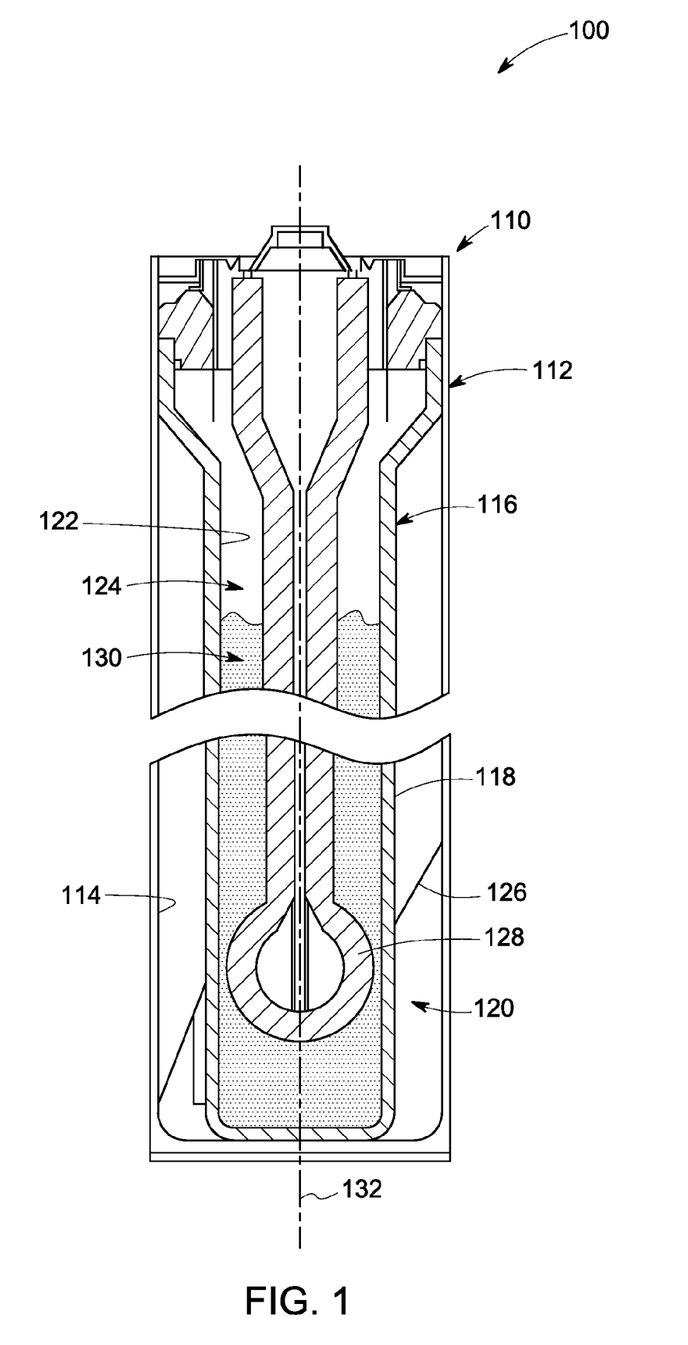
FIG. 1 is a schematic view illustrating a front cross-sectional view of an electrochemical cell in accordance with an embodiment of the invention.

Referring to FIG. 1 a front cross-sectional view 100 of an electrochemical cell 110 is provided. The electrochemical cell 110 consists of a housing 112. The housing 112 has an interior surface 114 defining a volume. A separator 116 is disposed inside the housing 112. The separator 116 has a first surface 118 that defines a first compartment 120, i.e., an anode compartment. The separator has a second surface 122 that defines a cathode compartment 124. An anode current collector 126 is connected to the anode compartment 120. A cathode current collector 128 is connected to the cathode compartment 124. A cathode composition 130 is disposed inside the cathode compartment 124. The cathode composition mainly consists of a cathode composition that includes at least one electroactive metal, an electrolyte salt comprising a reaction product of a second alkali metal halide and a metal halide, wherein the electrolyte salt has a melting point of less than about 300 degrees Centigrade; and a metal chloro sulfide compound having a formula (I) $M^1M^2_{p+1}S_nCl_{4+3p-2n}$ wherein "$M^1$" is a metal selected from group IA of the periodic table, "$M^2$" is a metal selected from group IIIA of the periodic table, "p" is 0 or 1, and "n" is equal to or greater than 0.5. The working temperature of the electrochemical cell 110, when it is a sodium-nickel chloride cell, is about 300 degrees Celsius.

The housing can be sized and shaped to have a cross-sectional profile that is square, polygonal, circular, or cloverleaf to provide maximal surface area for alkali metal ion transport; and can have a width to length ratio that is greater than about 1:10 along a vertical axis 132. In one embodiment, the length to width ratio of the housing is in a range of from about 1:10 to about 1:5, from about 1:5 to about 1:1, from about 1:1 to about 5:1, from about 5:1 to about 10:1, from about 10:1 to about 15:1. The housing can be formed from a material that is a metal, ceramic, or a composite; the metal can be selected from nickel or steel, the ceramic can be a metal oxide.

The ionic material transported across the separator between the anode compartment and the cathode compartment can be an alkali metal. Suitable ionic material may include one or more of sodium, lithium and potassium.

Typically, the anode compartment is empty in the ground state (uncharged state) of the electrochemical cell and is filled with metal from reduced metal ions that move from the cathode compartment to the anode compartment through the separator during the working of the cell. The anodic material, for example, sodium, is molten during use. The first compartment or the anode compartment may receive and store a reservoir of anodic material.

Additives suitable for use in the anodic material may include a metal oxygen scavenger. Suitable metal oxygen scavengers may include one or more of manganese, vanadium, zirconium, aluminum, or titanium. Other useful additives may include materials that increase wetting of the separator surface 116 defining the anode compartment, by the molten anodic material. Additionally, some additives may enhance the contact or wetting between the separator and the current collector, to ensure substantially uniform current flow throughout the separator.

The separator is an alkali metal ion conductor solid electrolyte that conducts alkali metal ions during use between the first compartment and the second compartment. Suitable materials for the separators may include an alkali-metal-beta'-alumina, alkali-metal-beta''-alumina, alkali-metal-beta'-gallate, or alkali-metal-beta''-gallate. In various embodiments, the solid separator may include a beta-alumina, a beta''-alumina, a gamma alumina, micromolecular sieve such as for example a tectosilicate, such as a felspar, or a felspethoid; or zeolite for example synthetic zeolite such as zeolite 3A, 4A, 13X, ZSM-5; rare-earth silicophosphates; silicon nitride; or a silicophosphate; a beta'-alumina; a beta''-alumina; a gamma alumina; a micromolecular sieve; or a silicophosphate (NASICON: $Na_3Zr_2Si_2PO_{12}$). In one embodiment, the separator includes a beta alumina. In one embodiment, a portion of the separator is alpha alumina and another portion of the separator is beta alumina. The alpha alumina may be relatively more amenable to bonding (e.g., compression bonding) than beta alumina, and may help with sealing and/or fabrication of the energy storage device.

The separator may be stabilized by the addition of small amounts of a dopant. The dopant may include one or more oxides selected from lithia, magnesia, zinc oxide, and yttria. These stabilizers may be used alone or in combination with themselves or with other materials. In one embodiment, the separator comprises a beta alumina separator electrolyte (BASE) and may include one or more dopants.

As noted above, the separator is disposed within the volume of the housing 112. The separator may have a cross-sectional profile normal to a vertical axis 132 of the housing 112, for example, a circle, a triangle, a square, a cross, or a star. Alternatively, the cross-sectional profile of the separator can be planar about the vertical axis 132. A planar configuration (or with a slight dome) may be useful in a prismatic or button-type battery configuration, where the separator is domed or dimpled. Similarly, the separator can be flat or undulated. In one embodiment, the solid separator may include a shape which may be flat, undulated, domed or dimpled, or comprises a shape with a cross-sectional profile that may be an ellipse, triangle, cross, star, circle, cloverleaf, rectangular, square, or multi-lobal. The separator can be a tubular container in one embodiment having at least one wall. The wall can have a thickness; and an ionic conductivity and the resistance across the wall may depend in part on the thickness. Suitable thickness of the wall can be less than 5 millimeters. A cation facilitator material can be disposed on at least one surface of the separator, in one embodiment. The cation facilitator material may include, for example, selenium.

Optionally, one or more shim structures can be disposed within the volume of the housing. The shim structures support the separator within the volume of the housing. The shim structures can protect the separator from vibrations caused by motion of the cell during use and thus reduce or eliminate movement of the separator relative to the housing. In one embodiment, a shim structure functions as a current collector.

The energy storage device may have a plurality of current collectors including anode current collectors and cathode current collectors. The anode current collector is in electrical communication with the anode chamber, and the cathode current collector is in electrical communication with the contents of the cathode chamber. Suitable materials for the anode current collector may include tungsten, titanium, nickel, copper, molybdenum, and combinations of two or more of the foregoing metals. Other suitable materials for the anode current collector may include carbon. The cathode current collector may be a wire, paddle or mesh formed from platinum, palladium, gold, nickel, copper, carbon, or titanium. The current collector may be plated or clad. In one embodiment, the current collector is free of iron. The plurality of current collectors can have thickness greater than 1 millimeter (mm).

The second compartment includes a cathode composition of the present invention. As noted above, the cathode composition comprises: at least one electroactive metal; a first alkali metal halide; an electrolyte salt comprising a reaction product of a second alkali metal halide and a metal halide, wherein the electrolyte salt has a melting point of less than about 300 degrees Centigrade; and a metal chlorosulfide compound having a formula (I) $M^1 M^2_{p+1} S_n Cl_{4+3p-2n}$ wherein "$M^1$" is a metal selected from group IA of the periodic table, "$M^2$" is a metal selected from group IIIA of the periodic table, "p" is 0 or 1, and "n" is equal to or greater than 0.5; and (c) a solid separator capable of transporting alkali metal ions between the first and the second compartments. The electroactive metal may be at least one selected from the group consisting of titanium, vanadium, niobium, molybdenum, nickel, iron, cobalt, chromium, manganese, silver, antimony, cadmium, tin, lead and zinc.

In one embodiment, the alkali metal forming the first alkali metal halide may be sodium, and the separator may be beta-alumina. In another embodiment, the alkali metal forming the first alkali metal halide may be potassium or lithium, with the separator then being selected to be compatible therewith.

In accordance with one aspect of the invention a method for preparation of the energy storage device is provided. The method comprises providing a housing having an interior surface defining a volume; disposing a separator inside the housing, wherein the separator has a first surface that defines at least a portion of a first compartment, and a second surface that defines a second compartment; wherein the first compartment is in ionic communication with the second compartment through the separator; disposing a cathode composition in the second compartment, wherein the cathode composition comprises: at least one electroactive metal, wherein the electroactive metal is at least one selected from the group consisting of titanium, vanadium, niobium, molybdenum, nickel, iron, cobalt, chromium, manganese, silver, antimony, cadmium, tin, lead and zinc; a first alkali metal halide; an electrolyte salt comprising a reaction product of a second alkali metal halide and a metal halide, wherein the electrolyte salt has a melting point of less than about 300 degrees Celsius; and a metal chlorosulfide compound having a formula (I) $M^1 M^2_{p+1} S_n Cl_{4+3p-2n}$ wherein "$M^1$" is a metal selected from group IA of the periodic table, "$M^2$" is a metal selected from group IIIA of the periodic table, "p" is 0 or 1, and "n" is equal to or greater than 0.5; wherein a molten solution of the metal chlorosulfide compound in the electrolyte salt is impregnated in a mixture comprising the at least one electroactive metal and the alkali metal halide. In one embodiment, the impregnation is carried out under vacuum.

In one embodiment, the electroactive metal component and metal chlorosulfide compound having a formula (I) are loaded separately and not in any combination other than being part of a particulate mixture. The method of the invention may include taking the battery through a plurality of battery charge/discharge cycles, to activate or condition the active cathode material to cause the formed electroactive metal salt and metal chlorosulfide compound having a formula (I) to combine together to form the electroactive metal sulfides or chloro sulfides.

A plurality of the electrochemical cells can be organized into an energy storage system. Multiple cells can be connected in series or parallel or in a combination of series and parallel. For convenience, a group of coupled cells may be referred to as a module or pack. The ratings for the power and energy of the module may depend on such factors as the number of cells in the module. Other factors may be based on end-use application specific criteria.

In one embodiment, the energy storage device may be rechargeable over a plurality of charge-discharge cycles. In another embodiment, the energy storage device may be employed in a variety of applications and the plurality of cycles for recharge is dependent on factors such as charge and discharge current, depth of discharge, cell voltage limits, and the like.

Various embodiments of the energy storage system can store an amount of energy that is in a range of from about 0.1 kiloWatt hours (kWh) to about 100 kWh. One embodiment of the energy storage system has an energy-by-weight ratio of greater than 100 Watt-Hours per kilogram, and/or an energy-by-volume ratio of greater than 200 Watt-Hours per liter. Another embodiment of the energy storage system has a specific power rating of greater than 150 Watts per kilogram and/or an energy-by-volume ratio of greater than 300 Watt-Hours per liter.

Suitable energy storage system may have an application specific power to energy ratio of less than about 10 per hour to about 1 per hour. In one embodiment, the specific power to energy ratio is in a range from about 1:1 to about 2:1, from about 2:1 to about 4:1, from about 4:1 to about 6:1, from about 6:1 to about 8:1, or from about 8:1 to about 10:1. In other embodiments, the power to energy ratio is in range from about 1:1 to about 1:2, from about 1:2 to about 1:4, from about 1:4 to about 1:6, from about 1:6 to about 1:8, or from about 1:8 to about 1:10.

In one embodiment of the energy storage system, a controller communicates with the plurality of the cells. The controller can distribute an electrical load to select cells in a cell module in response to feedback signals indicating states for each of the cells in the cell module. The controller can perform a re-warm method in which a series of heating elements are activated in a sequence to melt a frozen portion of the energy storage device in a pre-determined manner. In another embodiment, the controller may distribute an electrical load to select cathodic materials at pre-determined locations within individual cells.

In one embodiment, a heat management device maintains the temperature of the energy storage system. The heat management device can warm the energy storage system if too cold, and can cool the energy storage system if too hot to prevent an accelerated cell degradation. The heat management system includes a thaw profile that can maintain a minimal heat level in the anode and cathode chambers to avoid freezing of cell reagents.

Another embodiment of the invention provides an energy management system that includes a second energy storage device that differs from the energy storage device. This dual energy storage device system can address the ratio of power to energy in that a first energy storage device can be optimized for efficient energy storage, and a second energy storage device can be optimized for power delivery. The control system can draw from either energy storage device as needed, and charge back either energy storage device that needs such a charge.

Suitable second energy storage devices, for the power piece, include a primary battery, a secondary battery, a fuel cell, or an ultracapacitor. A suitable secondary battery may be a lithium battery, lithium ion battery, lithium polymer battery, or a nickel metal hydride battery.

EXAMPLES

The following examples illustrate methods and embodiments in accordance with the invention, and as such should not be construed as imposing limitations upon the claims. Unless specified otherwise, all the components are commercially available from common chemical suppliers as indicated in Table 1 below.

Example 1

Preparation of Cathode Composition

Step C: Preparation of Cathode Composition
The materials used for preparation of the cathode composition are listed below in Table 1.

| Material | Source | Properties |
| --- | --- | --- |
| Nickel 255 (metal nickel powder) | Inco Special products | 97.9 percent pure, 0.6 square meters per gram surface area, 2.2 to 2.8 micrometers particle size) |
| Sodium Chloride | Custom Powders Ltd, UK | 99.99 percent pure |
| Aluminum powder | Alfa Aesar Item #42919 | −100 + 325 mesh particle size, 99.97 percent pure |
| Elemental sulfur | Alfa Aesar | 100 mesh particle size, 99.5 percent pure |
| Iron disulfide | Sigma Aldrich | 99.9 percent pure |
| Sodium fluoride | Sigma Aldrich | ~99 percent pure |
| Sodium iodide | Sigma Aldrich | 99.999 percent pure |

The sodium chloride (NaCl) was heat treated at 220 degrees Centigrade under vacuum and milled to an average particle size of 90 percent less than 75 micrometers in a laboratory mill in a dry glove box. Cathode materials including metal nickel powder, sodium chloride, sodium bromide, sodium iodide and aluminum powder were pressed at ambient room temperature (typically 18 degree Centigrade to about 25 degree Centigrade) under a linear pressure of about 110 bar to about 115 bar using an Alexanderwerk WP50N/75 Roll Compactor/Milling Machine. The pressurized material was ground under a rotating mill into granules and the fraction containing a particle size of about 0.325 to about 1.5 millimeters was used for the cell assembly.

Step A: Preparation of an Electrolyte Salt: Sodium Tetrachloroaluminate

Sodium chloride and aluminum chloride were mixed and melted together to produce sodium tetrachloroaluminate (NaAlCl4). Aluminum chloride was volatile when melted, so mixing and melting of the electrolyte salt was done as a separate step before electrochemical cell fabrication.

Preparation of the electrolyte salt was carried out in a nitrogen purge box to keep the materials dry. To produce a 750 gram batch of NaCl-rich (basic) sodium tetrachloroaluminate, 500 grams of aluminum chloride and 250 grams of sodium chloride were mixed in a 500-milliliter reaction vessel. The reaction vessel was sealed with a clamped lid equipped with a gas outlet that was connected to a mineral oil bubbler to relieve any pressure.

The reaction vessel containing the dry powders was heated to 330 degrees Centigrade, which was above the melting point of the electrolyte salt mixture. Once melted, about 5 grams to 10 grams of aluminum powder was introduced to the molten salt. The aluminum powder, which oxidizes readily, acts to scavenge impurities present in the raw materials.

Once melted, with impurities precipitated out, the sodium tetrachloroaluminate was filtered to remove the aluminum powder and the precipitates. The molten salt was filtered through a heated (from about 200 to about 300 degrees Celsius) glass frit (25 micrometers minimum pore size). The filtered molten salt was collected on aluminum foil. Once the filtered molten salt has solidified, it was manually chipped into smaller pieces, then milled in a dedicated, laboratory-scale, grinding mill for 60 seconds. The sodium tetrachloroaluminate powder was stored in a glove box for use in cell fabrication as an electrolyte salt. Optionally, where needed, a portion of the sodium tetrachloroaluminate powder was combined with nickel chloride salt and sodium chloride to produce a ternary electrolyte, which was stored in a glove box for use in cell fabrication.

Step B: Preparation of Sodium Aluminum Chloro Sulfide $$NaCl + AlCl_3 \rightarrow NaAlCl_4 \qquad (1)$$

$$Na_2S + NaAlCl_4 \rightarrow NaAlSCl_2 + 2NaCl\downarrow \qquad (2)$$

The sodium tetrachloroaluminate required for the preparation of sodium aluminum chlorosulfide was prepared in accordance with Equation (1) as described in Step A above. Sodium aluminum chlorosulfide $NaAlSCl_2$ was prepared by the reaction of sodium sulfide $Na_2S$ with $NaAlCl_4$ in accordance with Equation (2). $Na_2S$ and 128 grams $NaAlCl_4$ (prepared as described above in Step A) were ground together to achieve intimate mixing. The resultant mixture was placed in a 250 milliliter glass flask equipped with a stirrer. The flask was heated to about 300 degrees Centigrade and maintained at that temperature for about 24 hours. The resultant molten mixture was filtered at about 300 degrees Centigrade temperature via Ni foam to remove the insoluble NaCl formed during the reaction as shown in Equation (2). The formation of sodium chloride was confirmed by powder X-ray analysis. The resultant solution of $NaAlSCl_2$ in $NaAlCl_4$ (123 grams) was used in the cathode composition.

X-Ray Analysis for NaCl

NaCl phase was identified by X-ray diffraction (XRD) using point-collimated copper radiation (1=1.542 Angstroms), a graphite monochromator, and an area-detector (GADDS, Bruker-AXS, Inc.). The sample was loaded into a 1 millimeter internal diameter glass capillary inside a glove box and the capillary was sealed with vacuum grease. The sample was exposed to an X-ray for about 10 minutes. The 2006 Powder Diffraction File Database was used for the phase identification.

Preparation of Electrochemical Cell

The electrochemical cell was assembled as follows. Separator tubes, cylindrical or cloverleaf in shape, were produced according to known methods or were commercially obtained. Each tube was ceramic sodium conductive beta"-alumina. The cylinder dimensions were 228 millimeters length, 36 millimeters internal diameter, and 38 millimeters outside diameter. Each ceramic separator tube was glass sealed to an alpha alumina collar to form an assembly. Each assembly was placed in a stainless steel can that served as the housing to form an electrochemical cell. The can size is about 38 millimeters×38 millimeters×230 millimeters.

The electrode composition granules prepared using the procedure mentioned above, was placed in the cloverleaf shaped β"-alumina tube as in Examples 1-9 or cylindrical shaped beta"-alumina tube as is the case in Example 10. The β"-alumina tube was preassembled with an anode chamber and a cathode current collector, and densified by vibration on a vibratory shaker in a nitrogen filled glove box. The cathode was then filled with either a solution of $NaAlSCl_2$ in $NaAlCl_4$ (as prepared in Step B) or with the molten sodium tetrachloroaluminate $NaAlCl_4$ (as prepared in Step A) under vacuum at 280 degrees Centigrade. Following this, the cell was welded at a temperature of about 230 degrees Centigrade inside the glove box using a MaxStar Miller Welder, with ultra-high purity argon purge, and tested for leaks.

Cell Test Protocol

All cells were been assembled in the discharged state. The testing protocol is as follows: The break-in (maiden) charge was carried out at a temperature of about 330 degrees Centigrade according the following sequence: 80 milliAmpere current for 2 hours, 400 milliAmpere for 2 hours, 800 milliAmpere for 2 hours, 2.75 Ampere for 8 hours, 5.5 Ampere until 2.67 Volt limit was reached, then constant voltage (CV) charge till the current limit was 0.5 Ampere. Cell testing was done at a temperature of about 300 degrees Centigrade. Then the cells were conditioned according to the parameters provided in Table 2. The cells were tested at 48 Ampere discharge and charge current. After each $20^{th}$ cycle, a conditioning cycle at 16 Ampere charge and discharge current was preformed until the current limit 0.5 Ampere was achieved.

TABLE 2

Parameters of the cell test protocol

| Cycle No. | Discharge | Charge |
|---|---|---|
| 1 | −16 A to 1.8 V | 10 A to 2.67 V, CV to I < 0.5 A |
| 2 | −32 A to 1.8 V | 10 A to 2.67 V, CV to I < 0.5 A |
| 3 | −48 A to 1.8 V | 10 A to 2.67 V, CV to I < 0.5 A |
| 4 | −16 A to 1.8 V | 32 A to 3.4 V, CV to I < 16 A |
| 5 | −16 A to 1.8 V | 48 A to 3.4 V, CV to I < 16 A |
| 20x | −48 A to 1.8 V, CV until I > −16 A | 48 A to 3.4 V, CV to I < 16 A |
| 1x | −32 A to 1.8 V | 10 A to 2.67 V, CV to I < 0.5 A |

Example 1, and Comparative Example 1-2 (E-1 and CE-1, CE-2)

The cells with similar nickel—sodium chloride cathodes containing about the same amount of sulfur additive—sodium aluminum chlorosulfide $NaAlSCl_2$ (E-1) and elemental sulfur (CE-1) and iron monosulfide FeS (CE-2) were assembled and tested according the testing protocol. The cathode compositions are given in Table 3 and the cell testing results are provided in FIG. 1. Control cells showed faster degradation as seen from FIG. 1.

TABLE 3

Cathode composition of Example Cells and Control Cells.

| Material in grams | E-1 | CE-1 | CE-2 |
|---|---|---|---|
| Ni | 134.2 | 137.6 | 137.4 |
| NaCl | 105.5 | 101.2 | 101.1 |
| Al | 1.9 | 2.0 | 1.7 |
| NaF | 2.5 | 4.9 | 4.8 |
| NaI | 1.0 | 1.0 | 1.0 |
| S | — | 1.4 | — |
| FeS | — | — | 3.9 |
| Total solids | 245.1 | 248.0 | 249.9 |
| $NaAlSCl_2$ | 11.9 | — | — |
| $NaAlCl_4$ | 111.0 | 115.0 | 125.0 |

Figure 2:
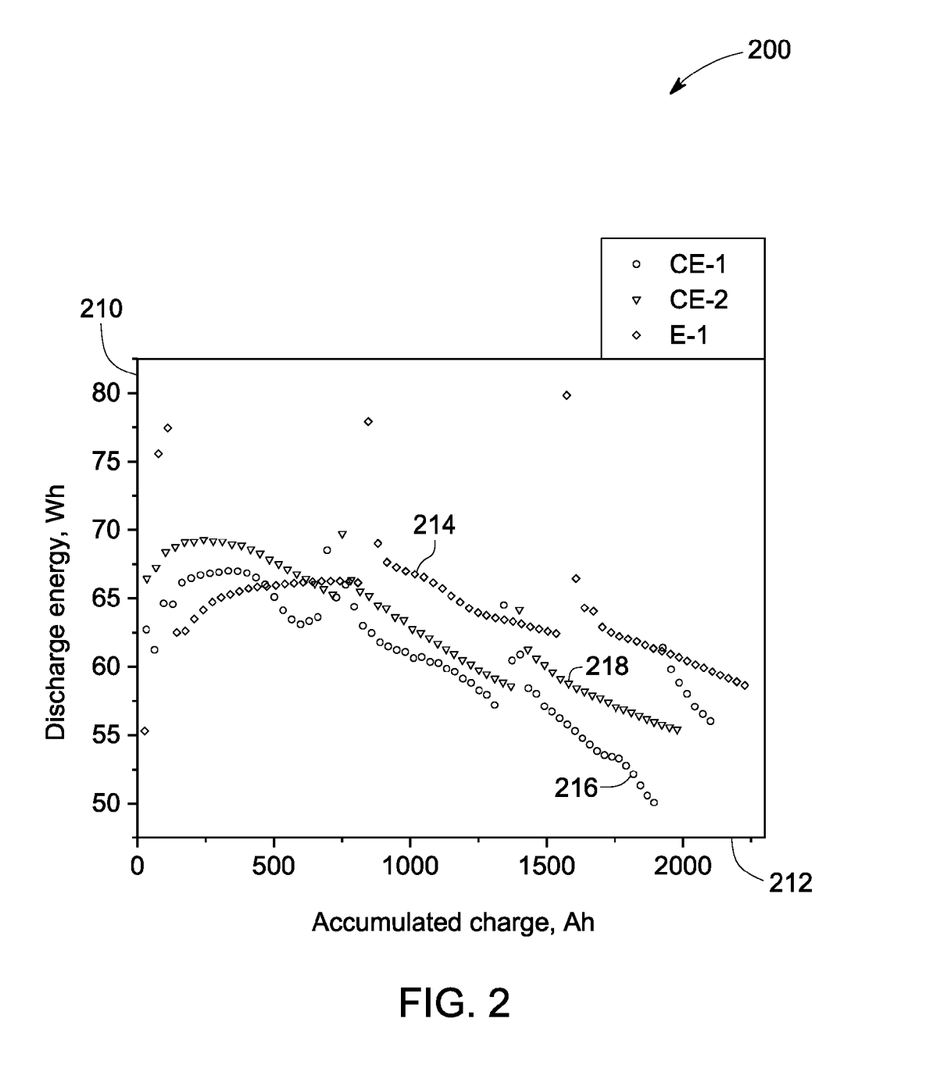
FIG. 2 is a graphical representation of the constant charge cycling of cells with different cathode compositions in accordance with the embodiments described herein.

Referring to FIG. 2, a graph 200 shows the constant charge cycling of cells in accordance with embodiments of the invention. The results shown in the graph were obtained for an average of about 10 cells with the cathode being made from the composition of E-1 and comparative examples CE-1 and CE-2. The graph includes discharge energy in watt-hour on the Y-axis 210 versus accumulated charge ampere-hour on the X-axis 212. Curve 214, 216, 218 provide the results for E-1, CE-1 and CE-2 respectively. As seen from curve 216 and curve 218 obtained for the cells including the cathode composition of CE-1 and CE-2 respectively showed a faster degradation in comparison with the curve 214 obtained for the cells including the cathode composition of E-1.

The foregoing examples are illustrative of some features of the invention. The appended claims are intended to claim the invention as broadly as has been conceived and the examples herein presented are illustrative of selected embodiments from a manifold of all possible embodiments. Accordingly, it is Applicants' intention that the appended claims not limit to the illustrated features of the invention by the choice of examples utilized. As used in the claims, the word "comprises" and its grammatical variants logically also subtend and include phrases of varying and differing extent such as for example, but not limited thereto, "consisting essentially of" and "consisting of." Where necessary, ranges have been supplied, and those ranges are inclusive of all sub-ranges there between. It is to be expected that variations in these ranges will suggest themselves to a practitioner having ordinary skill in the art and, where not already dedicated to the public, the appended claims should cover those variations. Advances in science and technology may make equivalents and substitutions possible that are not now contemplated by reason of the imprecision of language; these variations should be covered by the appended claims.

Reactants and components referred to by chemical name or formula in the specification or claims hereof, whether referred to in the singular or plural, may be identified as they exist prior to coming into contact with another substance referred to by chemical name or chemical type (e.g., another reactant or a solvent). Preliminary and/or transitional chemical changes, transformations, or reactions, if any, that take place in the resulting mixture, solution, or reaction medium may be identified as intermediate species, master batches, and the like, and may have a utility distinct from the utility of the reaction product or final material. Other subsequent changes, transformations, or reactions may result from bringing the specified reactants and/or components together under the conditions called for pursuant to this disclosure. In these other subsequent changes, transformations, or reactions, the reactants, ingredients, or the components to be brought together may identify or indicate the reaction product.

All ranges disclosed herein are inclusive of the endpoints, and the endpoints are combinable with each other. The terms "first," "second," and the like as used herein do not denote any order, quantity, or importance, but rather are used to distinguish one element from another. While the invention has been described in detail in connection with a number of embodiments, the invention is not limited to such disclosed embodiments. Rather, the invention can be modified to incorporate any number of variations, alterations, substitutions or equivalent arrangements not heretofore described, but which are commensurate with the scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A cathode composition comprising:
  at least one electroactive metal, wherein the electroactive metal is at least one selected from the group consisting of titanium, vanadium, niobium, molybdenum, nickel, iron, cobalt, chromium, manganese, silver, antimony, cadmium, tin, lead and zinc;
  a first alkali metal halide;
  an electrolyte salt comprising a reaction product of a second alkali metal halide and a metal halide, wherein the electrolyte salt has a melting point of less than about 300 degrees Celsius; and
  a metal chlorosulfide compound having a formula (I) $M^1M^2_{p+1}S_nCl_{4+3p-2n}$ wherein "$M^1$" is a metal selected from group IA of the periodic table, "$M^2$" is a metal selected from group IIIA of the periodic table, "p" is 0 or 1, and "n" is equal to or greater than 0.5.

2. The cathode composition according to claim 1, wherein the at least one electroactive metal is nickel.

3. The cathode composition according to claim 1, wherein the alkali metal comprises sodium, potassium, or lithium.

4. The cathode composition according to claim 1, wherein the electrolyte salt comprises at least one halogen selected from chlorine, bromine, and fluorine.

5. The cathode composition according to claim 1, wherein the electrolyte salt comprises sodium chloride and aluminum chloride in a molar ratio in a range of from about 0.53:0.48 to about 0.45:0.55.

6. The cathode composition according to claim 1, wherein the electrolyte salt comprises sodium tetrachloroaluminate.

7. The cathode composition according to claim 1, wherein the electrolyte salt comprising a first alkali metal halide and a metal halide has a melting point in a range from about 150 degrees Centigrade to about 300 degrees Centigrade.

8. The cathode composition according to claim 1, wherein the metal chlorosulfide compound comprises sodium aluminum chloro sulfide, lithium aluminum chloro sulfide, or sodium gallium chloro sulfide.

9. The cathode composition according to claim 1, wherein metal chlorosulfide compound is present in an amount in a range of from about 0.3 weight percent to about 10 weight percent based on the total weight of the cathode composition.

10. An article comprising:
  a cathode; wherein the cathode comprises:
    at least one electroactive metal, wherein the electroactive metal is at least one selected from the group consisting of titanium, vanadium, niobium, molybdenum, nickel, iron, cobalt, chromium, manganese, silver, antimony, cadmium, tin, lead and zinc;
    a first alkali metal halide;
    an electrolyte salt comprising a reaction product of a second alkali metal halide and a metal halide, wherein the electrolyte salt has a melting point of less than about 300 degrees Centigrade; and
    a metal chlorosulfide compound having a formula (I) $M^1M^2_{p+1}S_nCl_{4+3p-2n}$ wherein "$M^1$" is a metal selected from group IA of the periodic table, "$M^2$" is a metal selected from group IIIA of the periodic table, "p" is 0 or 1, and "n" is equal to or greater than 0.5.

11. The article according to claim 10, wherein the article is an energy storage device.

12. The article according to claim 10, wherein the metal chlorosulfide compound comprises sodium aluminum chlorosulfide.

13. An energy storage device comprising:
  (a) a first compartment comprising an alkali metal;
  (b) a second compartment comprising a cathode composition, the cathode composition comprising:
    at least one electroactive metal, wherein the electroactive metal is at least one selected from the group consisting of titanium, vanadium, niobium, molybdenum, nickel, iron, cobalt, chromium, manganese, silver, antimony, cadmium, tin, lead and zinc;
    a first alkali metal halide;
    an electrolyte salt comprising a reaction product of a second alkali metal halide and a metal halide, wherein the electrolyte salt has a melting point of less than about 300 degrees Centigrade; and
    a metal chlorosulfide compound having a formula (I) $M^1M^2_{p+1}S_nCl_{4+3p-2n}$ wherein "$M^1$" is a metal selected from group IA of the periodic table, "$M^2$" is a metal selected from group IIIA of the periodic table, "p" is 0 or 1, and "n" is equal to or greater than 0.5; and
  (c) a solid separator capable of transporting alkali metal ions between the first and the second compartments.

14. The energy storage device according to claim 13, wherein said device is rechargeable over a plurality of cycles.

15. The energy storage device according to claim 13, wherein said solid separator comprises a beta-alumina, a beta"-alumina, a gamma alumina, a micromolecular sieve, a silicon nitride, or a silicophosphate.

16. The energy storage device according to claim 13, wherein said solid separator comprises a shape which is flat, undulate, domed or dimpled, or comprises a shape with a cross-sectional profile that is an ellipse, triangle, cross, star, circle, cloverleaf, rectangular, square, or multi-lobal.

17. The energy storage device according to claim 13, wherein the metal chlorosulfide compound comprises sodium aluminum chloro sulfide.

18. An energy storage battery comprising a plurality of rechargeable energy storage devices, wherein each device is in accordance with claim 14.

19. A method for forming an energy storage device comprising:

providing a housing having an interior surface defining a volume;

disposing a separator inside the housing, wherein the separator has a first surface that defines at least a portion of a first compartment, and a second surface that defines a second compartment; wherein the first compartment is in ionic communication with the second compartment through the separator;

disposing a cathode composition in the second compartment, wherein the cathode composition comprises:

at least one electroactive metal, wherein the electroactive metal is at least one selected from the group consisting of titanium, vanadium, niobium, molybdenum, nickel, iron, cobalt, chromium, manganese, silver, antimony, cadmium, tin, lead and zinc;

a first alkali metal halide;

an electrolyte salt comprising a reaction product of a second alkali metal halide and a metal halide, wherein the electrolyte salt has a melting point of less than about 300 degrees Celsius; and a metal chlorosulfide compound having a formula (I) $M^1M^2_{p+1}S_nCl_{4+3p-2n}$ wherein "$M^1$" is a metal selected from group IA of the periodic table, "$M^2$" is a metal selected from group IIIA of the periodic table, "p" is 0 or 1, and "n" is equal to or greater than 0.5;

wherein a molten solution of the metal chlorosulfide compound in the electrolyte salt is impregnated in a mixture comprising the at least one electroactive metal and the alkali metal halide.

20. The method according to claim 19, wherein the impregnation is performed in vacuum.

* * * * *